C. D. McDONALD.
PROCESS FOR FORMING SCROLL EDGE METAL BLANKS.
APPLICATION FILED JULY 3, 1914.
1,202,546.
Patented Oct. 24, 1916.
2 SHEETS—SHEET 1.
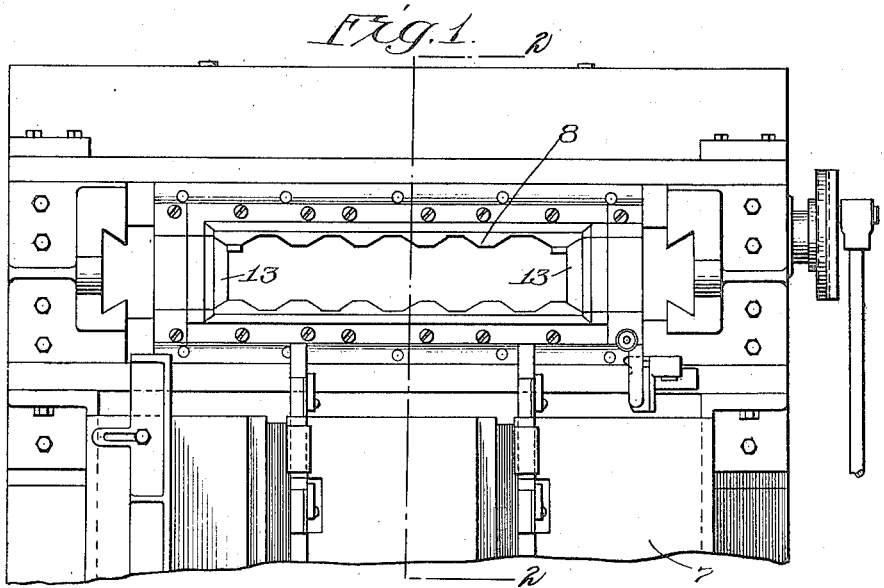
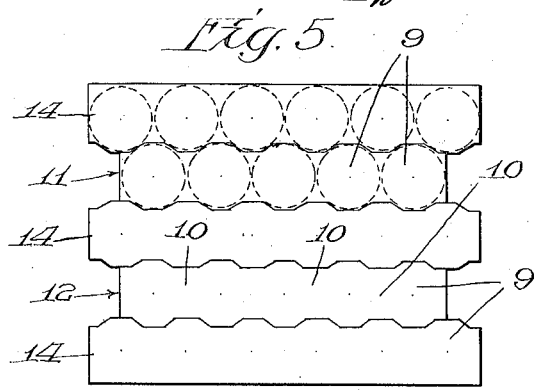
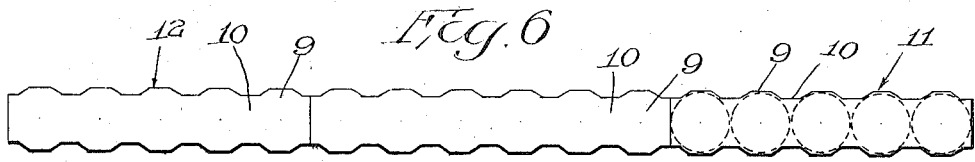
Witnesses:
Harry S. Gaither
W. Bond
Inventor
Charles D. McDonald
by Bauuur & Bauuur
Attys.

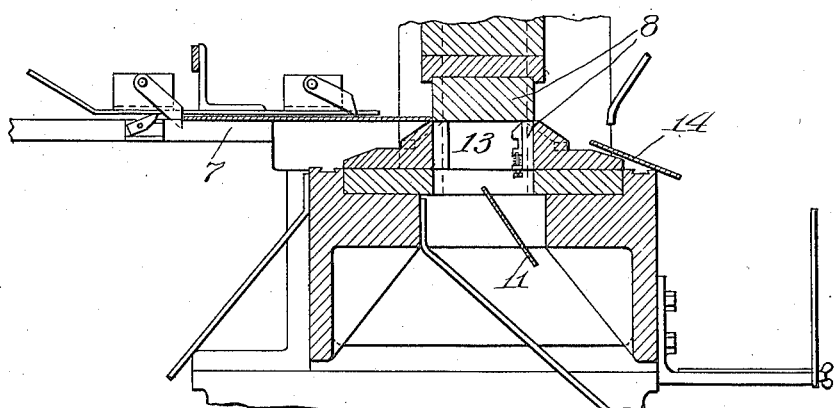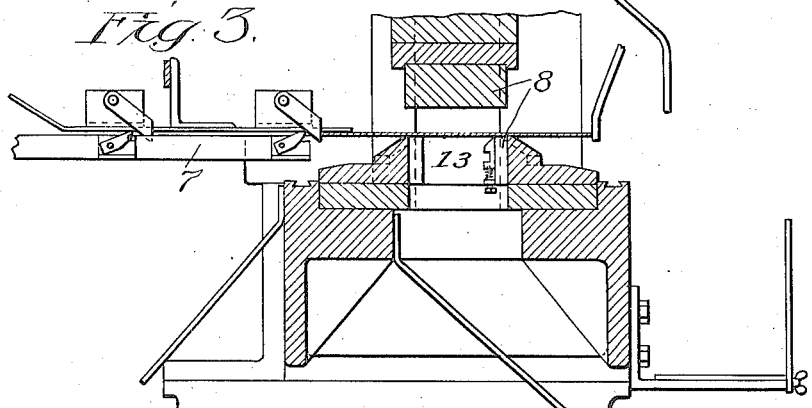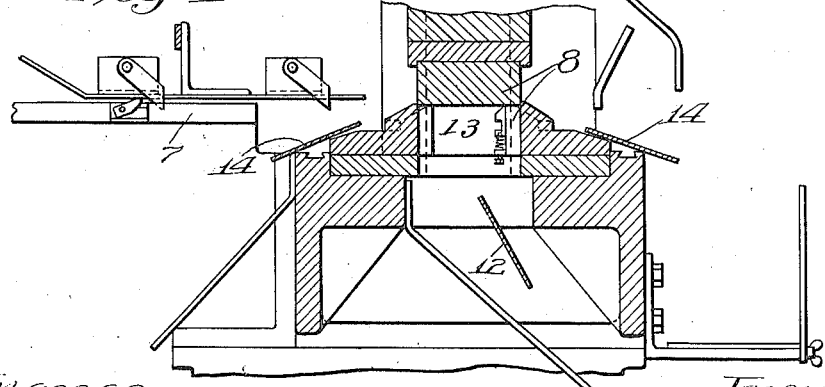

UNITED STATES PATENT OFFICE.

CHARLES D. McDONALD, OF CHICAGO, ILLINOIS, ASSIGNOR TO McDONALD MACHINE CO., OF CHICAGO, ILLINOIS, A CORPORATION OF ILLINOIS.

PROCESS FOR FORMING SCROLL-EDGE METAL BLANKS.

1,202,546.  Specification of Letters Patent.  Patented Oct. 24, 1916.

Application filed July 3, 1914. Serial No. 848,781.

*To all whom it may concern:*

Be it known that I, CHARLES D. McDONALD, a citizen of the United States, residing at Chicago, in the county of Cook and State of Illinois, have invented certain new and useful Improvements in Processes for Forming Scroll-Edged Metal Blanks, of which the following is a specification.

The present invention relates to a process for cutting a sheet of metal by a single operation into a series of blanks notched out along their edges to form a series of enlarged portions occurring at regular intervals and connected together by necks.

The objects of the present invention are to produce at a single operation a series of blanks in the nature of strips, which strips will have an undulating or notched edge which will constitute at regular intervals throughout the strip enlargements, each of which enlargements will be connected by a section of reduced width which may be termed a neck, and a further object lies in so cutting these strips whereby when they are placed end to end a continuous strip having at regular intervals enlarged portions of the nature referred to above will be produced, the purpose being to so configure the strips as to enable them to be fed through a die press without subjecting them to other than the single cutting operation, which produces the blank from the sheet.

The invention further consists in the features of construction and combination of parts hereinafter described and claimed.

In the drawings: Figure 1 is a plan view of the cutting end of a sheering machine showing an arrangement of die for cutting blanks in accordance with the present process; Fig. 2 is a section on line 2—2 of Fig. 1 showing the completion of the first operation of the shearing mechanism; Fig. 3 is a view on line 2—2 of Fig. 1 showing the work fed into position for the second operation of the cutting mechanism; Fig. 4 is a view on line 2—2 of Fig. 1 showing the completion of the second operation of the shearing mechanism; Fig. 5 is a plan view of a sheet of metal cut into strips according to the teachings of the present invention; and Fig. 6 is a plan view showing a series of such strips laid in end to end relation.

The machine illustrated in connection with the present application is of the general type shown and described in my Patent No. 1,110,810. Therefore, a detailed description of the machine itself at this time is not deemed necessary. It is sufficient to say that the work is fed across a table 7 by any suitable sort of feeding mechanism, and when so fed, is at the completion of each feeding movement centered with respect to a cutting or shearing die 8, after which the shearing or cutting die operates to produce the blanks.

In the machine illustrated in this application, as well as in my Patent No. 1,110,810, previously referred to, two blanks are produced by the first cut of the shearing mechanism and three blanks by the second cut. This will be clearly understood by referring to Figs. 2, 3, and 4. In Fig. 2 the work is shown at the completion of the first cutting operation. Prior to this operation the work is fed so that a strip of work extends beyond the die a distance equal to the width of the blank. The die is a double acting one making two cuts at a single operation and the two cutting surfaces of the die are spaced apart the distance of a to-be-formed blank. Thus when the die descends two blanks are formed by the first operation, as in Fig. 2, one consisting of that portion of the strip lying beyond the die and the other that portion of the sheet which lay between the cutting edges of the dies. After this cutting operation the work is fed into the position shown in Fig. 3 where a width extends on each side of the die equal to the width of a blank. The die then descends and cuts out the central portion of the work producing three blanks at the second cut.

In the machine of my patent above referred to, those strips which lie between the cutting edges of the die, namely, the second and fourth strips, as will be understood from Fig. 5, terminate in an enlarged head or end. As will be understood from the present drawings, the blanks are given a serrated or notched edge whereby when ultimately produced they consist of a series of enlarged portions connected together by what may be termed reduced or neck portions; the enlarged portions being indicated by the numeral 9 in Figs. 5 and 6, and the reduced or neck portions which connect the enlarged portions are indicated by the numeral 10 in the same figures.

With a blank so conformed circular articles, as for instance can tops, can be stamped out from the same with very little waste of material. The portions which are cut out by the die being indicated by the dotted circles in Figs. 5 and 6 also by reason of the configuration a greater number of strips can be cut from a sheet of metal than as though the edges were straight, owing to the neck portions of one strip corresponding and registering with the enlarged portions of the other strip. In cutting these blanks or strips according to the disclosure in my Patent No. 1,110,810 the second and fourth of the blanks, indicated by the numerals 11 and 12 respectively in Fig. 5, would each terminate at both ends in one of the enlarged portions 9; that is it would terminate centrally of one enlarged portion, so that a head would be formed on each end of such strips. In feeding these strips to the die press they are fed in end to end relation. Obviously with the heads which were present on the strips 11 and 12, this end to end feeding could not be successfully carried out because a half of one enlarged portion would be encountered every time one of the strips 11 or 12 was fed in, with the result that either the die press would have to be so timed as to miss a stroke when these heads registered with the die, or a cut would be produced by the press which would form a defective and incomplete article. Therefore in order to overcome this difficulty, I sever these surplus ends off from the body of the blank at the time the blanks having such ends are formed. To carry out this step of the process I provide in the construction shown cutting edges 13 extending between the undulating cutting edges of the cutting or shearing die 8 and these cutting edges 13 act, when the shearing mechanism is operated, to trim the end of the blanks 11 and 12 cutting off the enlarged portions or heads thereon so that these blanks each terminate midway of one of the neck portions 10, the same as do the first, third and fifth blanks designated in the drawings by the numeral 14. By this arrangement when the blanks are placed in end to end relation, as in Fig. 6, a continuous strip is formed having the enlarged portion 10 occurring at regular intervals throughout the length of the strip, and they can therefore be fed into the die press in successive order and in end to end relation, without necessitating any interruption of the action of the press, and with the result that a complete and perfect article is formed at each operation of the press. By this feature of trimming the edges of the blanks 11 and 12 I produce a series of blanks or strips, each of which terminates in an end of similar configuration whereby when placed end to end they form a continuous strip of uniform contour throughout. Although the cutting or shearing dies 13 provide an extremely practical means for trimming the ends of these blanks 11 and 12 it is obvious that other means might be employed, and it is therefore not the intention in the present invention to restrict the scope thereof to the use of cutting members similar to the cutting members 13. The purport of the present invention is to produce at a single operation a plurality of blanks or strips having an undulating or scroll-shaped edge in a manner whereby, when aligned end to end they will produce one continuous strip alike in contour throughout its length, whereby such strips may be fed into a die press without further treatment than received in the blank forming operation.

I claim:

1. A process for producing scroll-edged metal blanks, which consists in cutting a sheet of metal at intervals with winding cuts, producing a series of blanks of scroll formation along two opposed edges thereof, said blanks when so cut comprising a series of enlarged portions alternating with reduced neck portions, each alternate blank so produced terminating at each end midway a neck portion and the remaining blanks so produced terminating at each end midway an enlarged portion, and cutting each of the blanks terminating in the enlarged portions midway the last of the neck portion at each end thereof, whereby all of the blanks are made to terminate at each end midway a neck portion, substantially as described.

2. A process for producing scroll-edged metal blanks, which consists in cutting a sheet of metal at intervals with winding cuts, producing a series of blanks of scroll-formation along two opposed edges thereof, said blanks when so cut comprising a series of enlarged portions alternating with reduced neck portions, each alternate blank so produced terminating at each end at a point in said neck portions, and the remaining blanks so produced terminating at each end at a point in said enlarged portions, and cutting each of the blanks terminating in the enlarged portions at a point in the last of the neck portions at each end thereof, whereby the combined lengths of the neck portions at corresponding ends of any two adjacent blanks will be equal to the length of one full neck portion, substantially as described.

CHARLES D. McDONALD.

Witnesses:
 Wm. P. Bond,
 John A. Bode.